J. CRITES.
Horse Rake.
No. 31,875.  Patented April 2, 1861
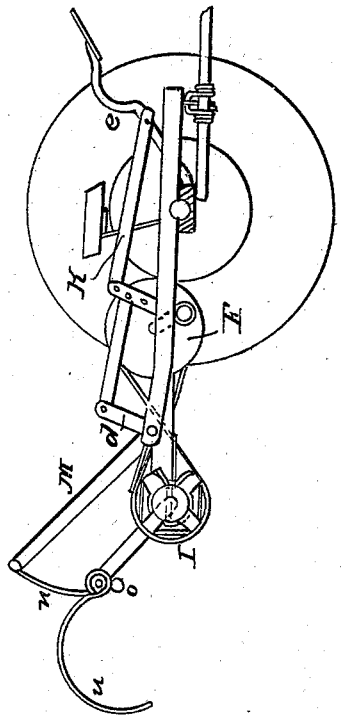
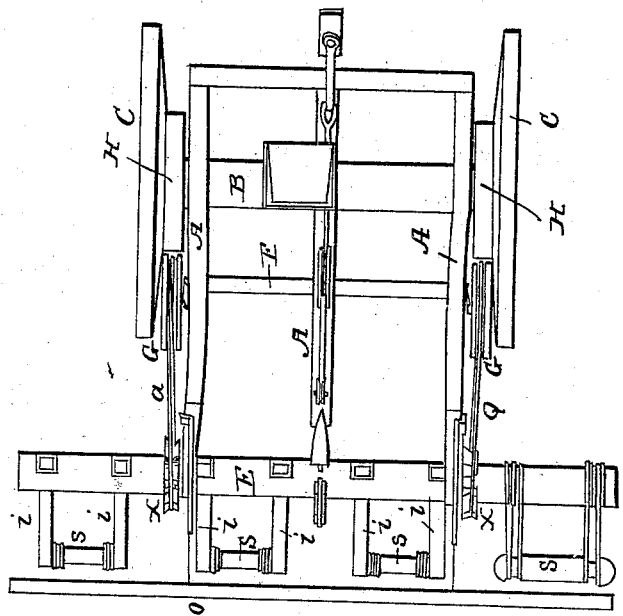

UNITED STATES PATENT OFFICE.

JONAH CRITES, OF ORRVILLE, OHIO.

IMPROVEMENT IN HORSE-RAKES.

Specification forming part of Letters Patent No. 31,875, dated April 2, 1861.

*To all whom it may concern:*

Be it known that I, JONAH CRITES, of Orrville, in the county of Wayne and State of Ohio, have invented certain new and useful Improvements in Hay-Rakes; and I do hereby declare that the following is a full, clear, and exact description of the same, reference being had to the accompanying drawings, and to the letters of reference marked thereon.

The nature of my invention consists in constructing and arranging the several parts of this rake in the manner hereinafter set forth.

In the annexed drawings, Figure 1 represents a plan view. Fig. 2 is a longitudinal vertical section.

In the figures, A represents the frame of the carriage, resting upon an axle, B, which is supported upon the two wheels C C. To the inner faces of the wheels C C are formed or secured the drums H H. Beneath the frame A, and secured to it in proper bearings, is a crank-shaft, F. Upon each of the cranks of this shaft are secured the grooved pulleys G G.

L is an arm secured to the crank-shaft, which projects above it, as shown. At the rear end of a portion of the frame (marked A') is secured a rectangular lever, d, which is connected to the arm L by means of a connecting-bar, J.

e represents a lever secured to the front portion of the frame, which connects to the arm L also by means of a connecting-bar, K.

E represents the rake-shaft, which is secured in proper bearings at the rear of the frame. This shaft is provided with two pulleys, x x, around which the bands a a pass from the pulleys G G. This shaft is provided, also, with a wheel I, which has an opening cut in its periphery, as seen in Fig. 2, into which the free end of the lever d catches, when desired, for stationing the rake in a raking position.

i i are arms extending out from the rake-shaft, which are connected by the bars s s s. The rake-teeth u are secured to these bars s.

When raking with this rake the end of lever d, catching in the opening in wheel I, stations the rake-shaft in the desired position; but when it is desired to have the rake relieved by a discharge of the hay I press upon the lever e, which, by means of the connecting-bars J and K, operates the crank-shaft F, and also the lever d. When the lever d is thrown up it relieves the wheel I, and at the same time it is relieved the pulleys G G are pressed against the drums H H upon the wheels C C by a partial revolution of the crank-shaft, and are set in motion by the motion of the wheels C, and through the bands a a and pulleys x x the rake-shaft is thus caused to make one revolution, discharging the hay which it has gathered. As soon as the rake-shaft has completed its revolution the power is removed from lever e, upon which the end of lever d catches into the opening in wheel I, stationing it, and the pulleys upon the crank-axle recede from the drums upon the wheel, and thus cease to exert power upon the rake-shaft. As often as the rake is filled or catches a sufficient quantity of hay or straw this operation is performed, and it is relieved and made ready for work again.

O is a clearer, which hangs above the rake, being a bar which is hung from the supports M, at the rear of the frame, by means of the rods u.

Having thus fully described my invention, what I claim as new, and desire to secure by Letters Patent, is—

The arrangement of the crank-axle F, provided with the grooved pulleys G G and with the arm L, the drums H H upon the drivers, the bands a a, the levers d and e, the connecting-bars J and K, with the rake-shaft E, provided with wheel I, the several parts being arranged and constructed so as to operate jointly, for the purpose specified.

JONAH CRITES.

In presence of—
PETER WALTER,
DANIEL C. WALTER.